Patented Feb. 9, 1954

2,668,856

UNITED STATES PATENT OFFICE 2,668,856

P-METHOXY BENZHYDRYL ETHERS

Henri Morren, Forest-Brussels, Belgium, assignor to Union Chimique Belge, S. A., Brussels, Belgium, a corporation of Belgium No Drawing. Application August 5, 1948, Serial No. 42,748

4 Claims. (Cl. 260—570)

This invention relates to a new class of substituted phenyl aminoethyl ethers and their salts and a method of producing them. More particularly, it deals with a class of such ethers and salts having antihistaminic properties, low toxicity and are preferably soluble in water.

It is an object to this invention to produce such a new class of substituted phenyl aminoethyl ethers and their salts having strong antihistaminic properties and weak toxicity.

Another object is to produce a new class of such ethers and their salts which are active against maladies of anaphylactic or allergic nature, such as: skin diseases or irritations including erythema and urticaria; vasomotor rhinitis, hay fever, asthma, bronchioconstriction; intolerance to medicines, reactions of certain serums; menstrual irregularities, such as: dysmenorrhea; etc.

Another object is to produce a new method for making such substances.

Another object is to improve the products and process for producing them which is disclosed in U. S. Patent 2,421,714, issued June 3, 1947, to George Rieveschl, Jr.

In accordance with this invention, the organic substituted phenyl aminoethyl ethers, upon which the antihistaminic substances are based, have the general formula of

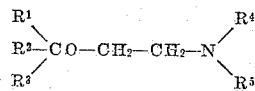

wherein $R^1$, $R^2$, and $R^3$ comprise organic radicals selected from the group consisting of phenyl, para-alkylphenyl, para-alkoxyphenyl, pyridyl and alkyl pyridyl radicals wherein the alkyl radical contains not more than 3 carbon atoms, and one of these radicals $R^1$, $R^2$, $R^3$, may be hydrogen if at least one of the others is a pyridyl or a para-substituted phenyl radical; and wherein $R^4$ and $R^5$ are selected from the group consisting of alkyl radicals and taken together with said nitrogen atom to which they are attached, may form a heterocyclic six membered ring, but in any case both $R^4$ and $R^5$ together do not contain more than five carbon atoms. For example, some of the free basic ethers of the class of the above formulas which have been prepared are: ether oxide of triphenyl carbinol and beta-dimethylaminoethanol, ether oxide of triphenyl carbinol and beta-diethyl amino-ethanol, ether oxide of triphenyl carbinol and beta-piperidinyl-ethanol, ether oxide of triphenyl carbinol and beta-morpholine-ethanol, ether oxide of phenyl-para- methoxyphenyl carbinol and beta-dimethyl aminoethanol, ether oxide of phenyl-paramethoxyphenyl carbinol and beta-diethyl aminoethanol, ether oxide of phenyl-paramethoxyphenyl carbinol and beta-piperidinyl ethanol, ether oxide of phenyl-paramethoxyphenyl carbinol and beta-morpholinyl ethanol, ether oxide of paratolyl-paramethoxyphenyl carbinol and beta-dimethyl aminoethanol, ether oxide of paratolyl-paramethoxyphenyl carbinol and beta-diethyl aminoethanol, ether oxide of diparamethoxyphenyl carbinol and beta-dimethylaminoethanol, ether oxide of diparamethoxyphenyl carbinol and beta diethylamino ethanol, ether oxide of 2-pyridylphenyl carbinol and of beta-dimethyl aminoethanol, ether oxide of 2-pyridyl-paramethoxyphenyl carbinol and beta-dimethyl aminoethanol, etc.

The salts of the above named free bases may be formed by neutralizing these bases with any inorganic or organic acid, such as: hydrochloric, boric, sulphuric, phosphoric, tartaric, ascorbic, sulphamic, acetic, oxalic, maleic, fumaric, 2-4 dihydroxybenzoic, etc. Although any one of these acids may be used, it is desirable to choose one which will form a water soluble crystalline salt with the basic ether desired.

The free basic ethers of this invention may be prepared in either one of two general ways: one by reacting the halide of the phenyl carbinol with the substituted aminoethanol or its alkali metal derivative; the other by reacting the aromatic carbinol or its alkali metal derivative with the halide of the substituted aminoethanol which particular method is particularly advantageous in preparing the basic ethers containing a pyridyl radical for $R^1$, $R^2$, or $R^3$, in the above generic formula. In reacting these substances it is desirable to do so in an inert solvent such as benzene, toluene, xylene, dioxane, or in a basic organic solvent such as pyridine, collidine, quinoline, etc. or similar related solvent at or between ordinary room temperature and their boiling temperatures. The resulting product may be freed from unreacted portions in the mixture and undesired by-products by: washing with water or an alkaline substance; extracting with a solvent of comparatively low boiling temperature such as benzol or ether; and may be dried by a dehydrating agent and/or by distillation including the formation of low boiling azeotropes. The desired product may also be isolated as a free base by distillation at reduced pressure, or by reacting it with a mineral or organic acid to form its corresponding salt in a medium in which said salt is insoluble and can be separated by filtration.

The particular choice of method used in preparing one of the substances of this invention for antihistaminic purposes depends largely upon the ease with which the starting material can be prepared, its reactivity, the yield obtained, the importance of the by-products formed, and the difficulty involved in separating the desired product from the reaction mixture and its purification.

It has been found that the biological activity of the different antihistaminic substances of this invention vary considerably among themselves when tested in vivo on guinea pigs according to the method of Friedlaender, Feinberg and Feinberg described in Laboratory Journal of Clinical Medicine, 32, 1947, pages 47 to 50. Also, the toxicity of the products depends in a large degree upon the nature of the substituents, and changes surprisingly by modifying only one of said substituents. Therefore, it is not possible to predict the activity or toxicity of any product in the class of substances of this invention without actual clinical tests. However, some compounds which include a heterocyclic radical such as pyridyl in the position $R^1$, $R^2$, or $R^3$ in the above mentioned formula, have been found to show notable antihistaminic activity and possess little toxicity producing no noticeable alteration of the tissue of the liver and kidneys of animals treated with these substances.

The above mentioned and other features and objects of this invention and the manner of attaining them will become more apparent and the invention itself will be best understood by reference to the following specific examples of the preparation of different substances of this invention and the results of their biological tests.

*Example I*

Ether oxide of phenyl-paramethoxyphenyl carbinol and of betadiethylaminoethanol and its hydrochloride.

The free base was prepared by reacting phenyl-para-methoxyphenyl-chloromethane with diethylaminoethanol.

The phenyl-paramethoxyphenyl carbinol was prepared according to the process of W. E. Buchmann described in the Journal of the American Chemical Society, vol. 55 (1933), pages 21–37, and then converted according to the same author into phenyl para-methoxyphenyl-chloromethane.

A 116 parts by weight of phenyl-paramethoxy-chloromethane were added to 500 parts by weight of toluene and to the resulting mixture 65 parts by weight of betadiethylaminoethanol was added. Then the entire mixture was refluxed for two hours. The refluxed mixture was cooled and 250 parts by weight of a 10% solution of sodium hydroxide were added. This alkaline mixture was then steam distilled until the distillate was only weakly alkaline, for example a pH 7.5–8.

The residue of this steam distillation was then mixed with 200 parts by weight of benzene and washed with water until the wash waters were practically neutral. The benzene solution was then evaporated to dryness until the resulting mixture was of constant weight (145 parts). This product was oily and was then dissolved in 3000 parts by weight of dry ether; and treated while being agitated with the theoretically equivalent amount of dry hydrochloric acid dissolved in ether. This product an oily product which solidified after standing overnight in an ice box.

The ether solution was decanted off and the solidified residue was dissolved in 1500 parts by weight of dioxane, and then precipitated with 3000 parts by weight of ether while being continuously agitated. The resulting solid product was the hydrochloride of ether oxide of phenyl-paramethoxyphenyl carbinol and diethylaminoethanol and had a melting point of 115° C. The amount obtained was 120 parts by weight and corresponded to a 68% yield.

*Example II*

Ether oxide of phenyl-paramethoxyphenyl carbinol and of betadimethylamino ethanol and its hydrochloride.

The hydrochloride was prepared in the same manner as in Example I by reacting 116 parts by weight of phenyl-para-methoxyphenyl-chloromethane, and 45 parts by weight of betadimethylaminoethanol in 500 parts by weight of toluene, 100 parts by weight of the desired product were obtained corresponding to a yield of 62% and having a melting point of 141° C.

*Example III*

Another method for preparing the same products of Examples I and II comprises reacting a phenyl-para-methoxyl-halomethane with an alkali metal salt of diethyl- or dimethyl-aminoethanol.

For example, a 117 parts by weight of diethylaminoethanol or 98 parts by weight of dimethylaminoethanol were refluxed for 10 hours with continuous mechanical agitation in the presence of 500 parts by weight of toluene and 34.5 parts by weight of metallic sodium, to prepare the desired alkali metal salt.

After separation of the unreacted sodium, 232.5 parts by weight of phenyl-para-methoxyphenyl chloromethane were added and the resulting mixture was refluxed for several hours. Then by treating the resulting reacted mixture in the same manner as stated in Example I, 210 parts by weight of the hydrochloride of the ether oxide of phenyl-paramethoxyphenyl carbinol and of betadiethylaminoethanol having a melting point of 114–115° C. was obtained, or correspondingly 160 parts by weight of the hydrochloride of the phenyl-paramethoxyphenyl carbinol and of beta-diethylaminoethanol having a melting point of 140–141° C. was obtained.

*Example IV*

Still another method of preparing the hydrochloride of the ether oxide of phenyl-paramethoxyphenyl carbinol and of beta-dimethylaminoethanol, the product of Example II comprises reacting phenyl-para-methoxyphenyl carbinol with dimethylbetachlorethyl-amine.

The dimethylbetachlorethyl-amine may be prepared by any known method, for example by reacting thionylchloride with beta-dimethylaminoethanol in the presence of benzene. The resulting chloride product, after washing wth benzene, is cooled and treated with a solution of sodium hydroxide and then extracted with benzene or toluene. This extract is then filtered and dehydrated with potassium carbonate and then eventually further dehydrated by forming a low boiling azeotrope with the remaining water in the mixture. This solution must be utilized immediately to prevent its decomposition.

In the meantime, a suspension of 20 parts by weight of powdered sodium amide in 400 parts by weight of toluene was prepared, and then was added little by little to this suspension 107 parts by weight of phenyl-paramethoxyphenyl carbinol dissolved in an equal weight of toluene. This reaction mixture was then heated on a water bath and ammonia was driven off.

Then to the last prepared cool mixture, 50 parts by weight of dimethylbetachlorethyl-amine previously prepared, and dissolved in toluene was added. This combined mixture was then refluxed for 10 hours.

To the resulting product, an excess of a dilute solution of sodium hydroxide was added, and then steam distilled until the distillate was slightly alkaline. The resulting residue is then treated with 2000 parts by weight of benzene and washed with water until it was neutral.

Continued purification and isolation of the product according to well known procedures yielded 100 parts by weight of the desired hydrochloride of the ether oxide of phenyl-paramethoxyphenyl carbinol and of beta-dimethylaminoethanol.

Example V

Ether oxide of di(para-methoxyphenyl)carbinol and of beta dimethylamino-ethanol and its hydrochloride.

The free base was prepared by reacting di-(para-methoxyphenyl)carbinol with dimethylbetachlorethyl amine, similar to that described in Example IV above. In such case, 40 parts by weight of sodium amide were pulverized and suspended in 400 parts by weight of toluene, to which was added little by little 114 parts by weight of di-(para-methoxyphenyl)carbinol dissolved in equal weight of toluene. By continuing as indicated in Example IV above, 110 parts by weight of the hydrochloride of the ether oxide of di-(para-methoxyphenyl)carbinol and beta dimethylaminoethanol was obtained having a melting point of 110° C.

An excess of dimethylbetachlorethyl-amine may be used in this reaction to increase the yield of the desired product.

Example VI

Ether oxide of di(para-methoxyphenyl)carbinol and of beta-dimethyl (or diethyl)aminoethanol and their maleate.

The free base was prepared by reacting the corresponding dialkylaminoethanol with a di-(para-methoxyphenyl)halomethane.

117 parts by weight of beta-diethylaminoethanol were dissolved in 500 parts by weight of toluene to which was added 40 parts by weight of powdered sodium amide. The resulting mixture was refluxed for several hours while being continuously agitated, until substantially one molar quantity of ammonia had been emitted.

The solution was then cooled, and 262.5 parts by weight of di-(para-methoxyphenyl) chloromethane were added and the mixture was refluxed for two hours and further treated as in Example I.

The respective residues after evaporation of the benzene were treated in accordance with the weight of product obtained in an ether solution containing an equi-molecular amount of maleic acid. The resulting crystalline products were dissolved in dioxane and precipitated with ether to obtain 260 parts by weight of the maleate of the ether oxide of di(para-methoxyphenyl)carbinol and of beta-diethylaminoethanol having a melting point of 72° C.; and correspondingly 250 parts by weight of the dimethyl compound having a melting temperature of 108-109° C.

Example VII

Ether oxide of paramethoxyphenyl-paratolyl-carbinol and of beta-diethyl (or dimethyl) aminoethanol and their maleate was prepared by reacting para-methoxyphenyl-para-tolyl chloromethane with a dialkylaminoethyl carbinol.

The paramethoxyphenyl-paratolyl carbinol was synthesized by reacting para-anisaldehyde with magnesium para-methylphenyl-bromide according to the process of W. E. Bachmann and J. W. Ferguson (described in the Journal of American Chemical Society, 56 (1934), page 2081). The resulting product was crystallized in a solution of hexane and had a melting point of 63-64° C. This carbinol was then converted to its corresponding chloromethane according to W. E. Bachmann, and reacted with beta-diethylaminoethanol or dimethylaminoethanol according to the method described in Examples I, II, III or VI above.

The corresponding maleates have been isolated and found to have melting points of 106-107° C. (for the dimethyl compound) and 126-127° C. (for the diethyl compound).

Example VIII

Ether oxide of triphenylcarbinol and of beta-diethylaminoethanol and its hydrochloride.

The free base was prepared easily by condensing the diethylaminoethanol with tritylchloride in the presence of a basic solvent, such as pyridine, similar to the method described in Examples I, II, III and VI above.

278 parts by weight of tritylchloride were dissolved in 500 parts by weight of pyridine and to this mixture were added 234 parts by weight of beta-diethylaminoethanol. After the mixture rested overnight, 5000 parts by weight of ether were added and extracted several times with a solution of sodium bicarbonate. After separating the ether layer, this layer was treated with 100 parts by weight of a 10% solution of sodium hydroxide. The resulting washed product was then steam distilled until the distillate was nearly neutral. The residue was extracted with benzene. This benzene solution was evaporated until dry and a constant weight to obtain 360 parts by weight of a thick oil which was then dissolved in 5000 parts by weight of ether and treated with 90% of its theoretical quantity of dry hydrochloric acid dissolved in ether. The resulting thick mass which was precipitated, was dissolved, after decantation of the ether solution, in 1500 parts by weight of pure acetone and precipitated again by 8000 parts by weight of ether. The final separated crystalline product had a melting point of 146-147° C. and amounted to 220 parts by weight.

Example IX

Ether oxide of triphenylcarbinol and of beta-dimethylaminoethanol and its hydrochloride.

The salt was also prepared in the same manner as indicated in Example VIII above and a crystalline product having a melting point of 190-191° C. was obtained.

Example X

Ether oxide of 2-pyridyl phenylcarbinol and of beta-dimethylaminoethanol and its hydrochloride.

The free base was prepared by reacting 2-pyridyl-phenyl carbinol with dimethyl-betachlorethyl-amine.

The 2-pyridyl-phenylcarbinol was prepared either according to the method of J. Overhoof and W. Proost (Recueil Travaux Chimiques des Pays-Bas 57 (1938), pages 179–184) by reacting the benzaldehyde on a magnesium compound of 2-bromopyridine or according to the method of Ashworth, Daffern and Heemich (J. Chem. Soc. of London 1939, pages 809–812) by decarboxylation of the picolinic acid in the presence of benzaldehyde at 175° C.

18.5 gr. (0.1 mol) of 2-pyridyl-phenyl carbinol were added in a suspension of 12 gr. of sodium amide (0.3 mol) in 60 cc. of toluene. After all of the ammonia was removed, a paste of 28.8 gr. (0.2 mol) of dimethyl-betachloroethylamine hydrochloride and 100 cc. of toluene, was added to the previous mixture. The resulting mixture was then refluxed for ten hours.

After cooling, the residue was extracted with an hydrochloric acid solution of marked acidity, the acid solution was separated from the toluene, and then the acid solution was decolorized by treatment with an adsorbent such as activated charcoal.

The unreacted 2-pyridyl-phenylcarbinol in the mixture was separated by adding sodium acetate until the mineral acidity of the mixture disappeared. Then the carbinol was extracted with an appropriate organic solvent.

The resulting aqueous solution was made strongly alkaline when cooled, and the resulting antihistaminic substance therein was extracted with ether. This extract was carefully washed with a solution of sodium chloride and dried by anhydrous potassium carbonate, and then distilled under vacuum. The resulting product distilled at a temperature between 155° and 160° C. at a pressure of 4 mm. of mercury. The distillate which amounted to 15 gr., was dissolved in hexane, filtered through activated charcoal, evaporated and redistilled.

The resulting desired salt was hygroscopic and did not crystallize.

*Example XI*

Ether oxide of 2-pyridyl-para-methoxyphenylcarbinol and betadimethylamino ethanol and its salts.

The free base was prepared by reacting 2-pyridyl-para-methoxyphenyl carbinol with dimethylbetachlorethyl-amine.

The 2-pyridyl-para-methoxyphenyl carbinol was prepared according to Ashworth et al. (as mentioned above) and was obtained with a very low yield by decarboxylation of picolinic acid in the presence of anisaldehyde at 175° C., and had a melting point of 131.5° C.

The same carbinol was prepared with a good yield by reacting anisaldehyde with a magnesium compound of 2-bromopyridine, the latter being prepared by reacting 2-bromopyridine on magnesium in the presence of anhydrous ether and ethyl chloride.

By continuing the reaction as described in Example X above a yield of 90% was obtained of the desired product, which distilled at about 185° C. under a pressure of 2–3 mm. of mercury.

The usual salts of this free base could not be crystallized, although perfect crystals of the base with 2-4-dihydroxybenzoic acid, boric acid, or fumaric acid was prepared. The fumaric acid salt of this free base had a melting point of 126–127° C. It is interesting to note that the isomer of this acid, viz. maleic acid, did not form a crystalline salt with the free base.

In order to clarify the above examples and indicate the organic substituted radicals corresponding to each of the products prepared therein as well as several other prepared products by similar processes, and to indicate their relative antihistaminic activity, reference is made to the following table. In this table, the activity of each substance has been determined according to two methods: (A) the method of Halporn (Arch. int. Pharmacodynamie 68 (1942), 338–408) by testing the isolated intestines of guinea pigs, and (B) by the method of Friedlaender, Feinberg and Feinberg (J. Lab. Clin. Medicine, 32 (1947), 47–50) by neutralization of toxic doses of histamine, i. e. by the injection of 10 mg. of the product per kg. of the animal's weight. The general formula of the salts whose radicals are indicated in the table below is

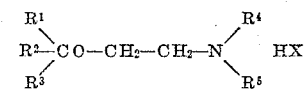

| Ex. | $R^1$ | $R^2$ | $R^3$ | $R^4 / R^5$ | HX | Melting Point °C. | Activity A | Activity B |
|---|---|---|---|---|---|---|---|---|
| I | phenyl | p-methoxy phenyl | hydrog | diethyl | hydrochloric | 115 | 50 | -- |
| II, III, IV | do | do | do | dimethyl | do | 141 | 100 | 80 |
| | do | do | do | piperidinyl | do | 138 | -- | -- |
| | do | do | do | morpholinyl | do | 126 | -- | -- |
| V | p-methoxy phenyl | do | do | dimethyl | do | 110 | 33 | 10 |
| VI | do | do | do | do | maleic | 108–109 | -- | -- |
| VI | do | do | do | diethyl | do | 72 | 15 | -- |
| VII | p-tolyl | do | do | do | do | 106–107 | 25 | -- |
| VII | do | do | do | dimethyl | do | 126–127 | 65 | 20 |
| VIII | phenyl | phenyl | phenyl | diethyl | hydrochloric | 146–147 | -- | -- |
| IX | do | do | do | dimethyl | do | 190–191 | 20 | -- |
| | do | do | do | pipidinyl | do | 140 | -- | -- |
| | do | do | do | morpholinyl | do | 172 | -- | -- |
| X | 2-pyridyl | do | hydrog | dimethyl | do | ------ | -- | 40 |
| XI | do | p-methoxyphenyl | do | do | fumaric | 126–127 | -- | 100+ |

Tests have shown that the toxicity of these substances by themselves is very weak according to the results from injections of these substances under the skin of rats. For example, the hydrochloride of the ether oxide of phenyl-paramethoxyphenyl carbinol and of dimethyl aminoethanol (of Example II or III or IV) and the maleate of the ether oxide of di(para-methoxyphenyl) carbinol and of beta-dimethylaminoethanol (of Example VI) may be tolerated in an amount up to 350 mg. per kg. of animal, the lethal dose being 400 mg. per kg.

In the above table, attention is called to the product of Example XI which was found to have an activity by method (B) of Friedlaender, Feinberg and Feinberg of more than 100.

While there are described above the principles of this invention in connection with specific examples and methods, it is to be clearly understood that this description is made only by way

What is claimed is:
1. A compound of the class consisting of a free base and its acid salts, said free base having the formula:

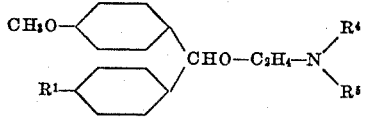

wherein $R^1$ is selected from the group of radicals consisting of hydrogen, methyl and methoxy radicals, and $R^4$ and $R^5$ are selected from the group of aliphatic radicals consisting of methyl and ethyl radicals, and when the $R^1$ radical contains a carbon atom then $R^4$ and $R^5$ are only methyl radicals.

2. Hydrochloride of the ether oxide of phenyl para-methoxyphenylcarbinol and of beta-dimethylaminoethanol.

3. Hydrochloride of the ether oxide of phenyl-paramethoxyphenyl carbinol and of beta-diethylaminoethanol.

4. Maleate of the ether oxide of paramethoxyphenyl-paratolyl carbinol and of beta-dimethylaminoethanol.

HENRI MORREN.

References Cited in the file of this patent

UNITED STATES PATENTS

| Number | Name | Date |
|---|---|---|
| 2,455,949 | Rieveschl, Jr. | Dec. 14, 1948 |
| 2,567,351 | Rieveschl, Jr. | Sept. 11, 1951 |